(12) United States Patent
Nguyen et al.

(10) Patent No.: US 10,677,600 B2
(45) Date of Patent: Jun. 9, 2020

(54) NAVIGATION SYSTEM FOR A MULTI-DIMENSIONAL PARAMETER SPACE

(71) Applicant: Accenture Global Solutions Limited, Dublin (IE)

(72) Inventors: David H. Nguyen, Santa Clara, CA (US); Taurean Dyer, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 97 days.

(21) Appl. No.: 15/705,467

(22) Filed: Sep. 15, 2017

(65) Prior Publication Data

US 2019/0086218 A1 Mar. 21, 2019

(51) Int. Cl.
*G01C 21/34* (2006.01)

(52) U.S. Cl.
CPC .................. *G01C 21/3415* (2013.01)

(58) Field of Classification Search
CPC ................................................ G01C 21/3415
See application file for complete search history.

(56) References Cited

U.S. PATENT DOCUMENTS

| | | | |
|---|---|---|---|
| 2003/0046265 A1* | 3/2003 | Orton | G06Q 10/10 |
| 2006/0288049 A1* | 12/2006 | Benedetti | G06F 9/526 |
| 2009/0328072 A1* | 12/2009 | Shin | G06F 9/451 |
| | | | 719/318 |
| 2010/0070448 A1* | 3/2010 | Omoigui | H01L 27/1463 |
| | | | 706/47 |
| 2011/0238647 A1* | 9/2011 | Ingram | G08G 1/20 |
| | | | 707/706 |
| 2013/0151681 A1* | 6/2013 | Dournov | G06F 8/656 |
| | | | 709/223 |
| 2014/0129942 A1* | 5/2014 | Rathod | H04N 21/44222 |
| | | | 715/720 |
| 2014/0195865 A1* | 7/2014 | Ikegami | G06F 11/3055 |
| | | | 714/57 |
| 2016/0110224 A1* | 4/2016 | Cao | G06F 11/3003 |
| | | | 718/104 |
| 2017/0109850 A1* | 4/2017 | Chetlur | G06Q 50/2057 |

* cited by examiner

*Primary Examiner* — Frederick M Brushaber
(74) *Attorney, Agent, or Firm* — Brinks Gilson & Lione

(57) ABSTRACT

A navigation system for a multi-dimensional parameter space helps facilitate reaching a desired destination along a predefined path. The system provides technical solutions to reaching the destination along even complex paths, including analyzing a large search space for waypoints that fall along the predefined path. For instance, the waypoints along the path may be numerous, may create path branches, or may be characterized by many different dimensional parameters.

16 Claims, 10 Drawing Sheets

NAVIGATION SYSTEM FOR A MULTI-DIMENSIONAL PARAMETER SPACE

TECHNICAL FIELD

This application relates to navigating through waypoints along a multi-dimensional parameter space.

BACKGROUND

Navigating to a destination is often difficult, complex, technically challenging endeavor. This is particularly true when there are many waypoints along the path to the destination that create path branches, or when the waypoints that must be met are characterized by many different dimensional parameters. Improvements in navigation systems for multi-dimensional parameter spaces will help facilitate navigation to a desired destination.

DETAILED DESCRIPTION

Effectively navigating to a target goal is a significant technical challenge. The navigation system described below provides technical solutions to guiding an entity along a sequence of pre-defined waypoints on a path to a pre-determined target goal. In one aspect, the navigation system provides a central guidance mechanism for discovering, evaluating, and selecting spatial-temporal opportunities that match the pre-defined waypoints. The navigation system may deliver the selected environmental opportunities to the entity for consideration in moving along the path to the target goal, or may automatically select and execute on the opportunities.

Figure 1:
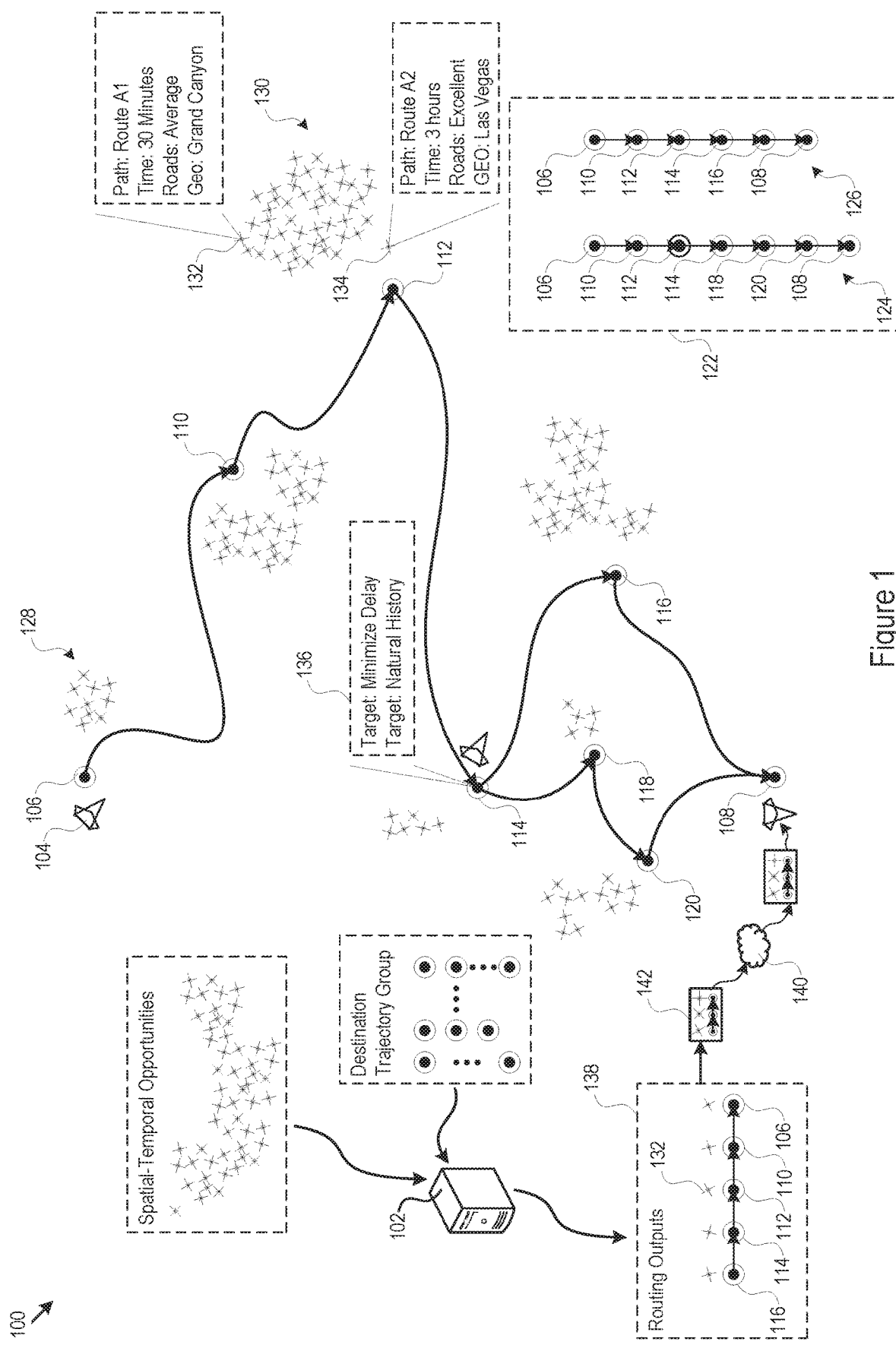
FIG. 1 shows an example navigation context.

FIG. 1 provides an example context 100 for the discussion below of the technical solutions in the navigation system. The discussion of FIG. 1 refers to a few of many possible implementations. In that respect, the technical solutions are not limited in their application to the implementations or the context shown in any of the Figures, but are applicable to many other system implementations.

FIG. 1 shows a navigation system 102 which will guide an entity 104 from a starting waypoint 106 to a goal waypoint 108. The starting waypoint 106 and the goal waypoint 108 are waypoints along a path, as are the intermediate waypoints 110, 112, 114, 116, 118, and 120. There may be any number of waypoints along a path, and there may be multiple paths from the starting waypoint 106 to the goal waypoint 108. In FIG. 1 there are two paths from the starting waypoint 106 to the goal waypoint 108: waypoints {106→110→112→114→120→118→108} and waypoints {106→110→112→114→116→108}. A destination trajectory group is the set of different paths from a starting position to a destination position, e.g., the destination trajectory group 122 includes the first path 124 and the second path 126.

Waypoints are characterized by one or more dimensions corresponding to pre-determined target criteria. That is, the waypoint dimensions capture the target criteria for the waypoints along the path. Two example dimensions are spatial and temporal dimensions, e.g., an entity may have target criteria of being at a particular place at a particular time. Further examples of waypoint dimensions are given below.

The navigation system 102 facilitates movement of the entity between the waypoints, and thereby along any of the paths in the destination trajectory group. In that regard, the navigation system 102 executes waypoint evaluation circuitry on spatial-temporal descriptors and upcoming waypoint dimensions as described below. The spatial-temporal descriptors ("descriptors") characterize spatial-temporal events and opportunities ("SEOs") in time and space potentially available as navigation options to the entity, when the entity is located at a specific waypoint. For instance, in FIG. 1, the descriptors 128 characterize SEOs potentially available at the starting waypoint 106, while the descriptors 130 characterize SEOs potentially available at the intermediate waypoint 112. The same SEO may be available at multiple different waypoints.

FIG. 1 shows a specific example descriptor 132. The descriptor 132 captures that, at waypoint 112, a navigation opportunity SEO exists to take Route A1, with an expected travel time of 30 minutes, along which a geographic point of interest exists: the Grand Canyon. The descriptor 134 captures that, at waypoint 112, a navigation opportunity SEO exists to take Route A2, with an expected travel time of 3 hours that goes through Las Vegas. The waypoint evaluation circuitry in the navigation system 102 determines how well each SEO matches to, or meets the target criteria defined as the waypoint dimensions for an upcoming waypoint. The target criteria for any waypoint may vary widely between waypoints. In FIG. 1, for instance, the waypoint dimensions 136 specify that the entity prefers to minimize travel delay, but also wants to experience natural history. As such, the waypoint evaluation circuitry may rank the SEO expressed in descriptor 132 above the SEO expressed in descriptor 134 as a next movement choice for the entity.

The navigation system 102 may transmit SEO rankings, recommendations, or automatic selections may be transmitted to the entity in a set of, e.g., routing outputs 138 over any wired or wireless networks 140. In that regard, the navigation system 102 may render and deliver machine interfaces 142, including GUIs, that capture the SEO information to the entity. In some implementations, the navigation system 102 automatically selects each SEO to follow at each waypoint, and automatically builds (and may periodically update) a guidance queue for the entity. The guidance queue then captures for the entity a set of navigation opportunities that may be readily followed to help the entity not only best meet each of the target criteria for each waypoint, but also arrive at the goal waypoint which may represent an ultimate set of target criteria. Further examples are given below.

Figure 2:
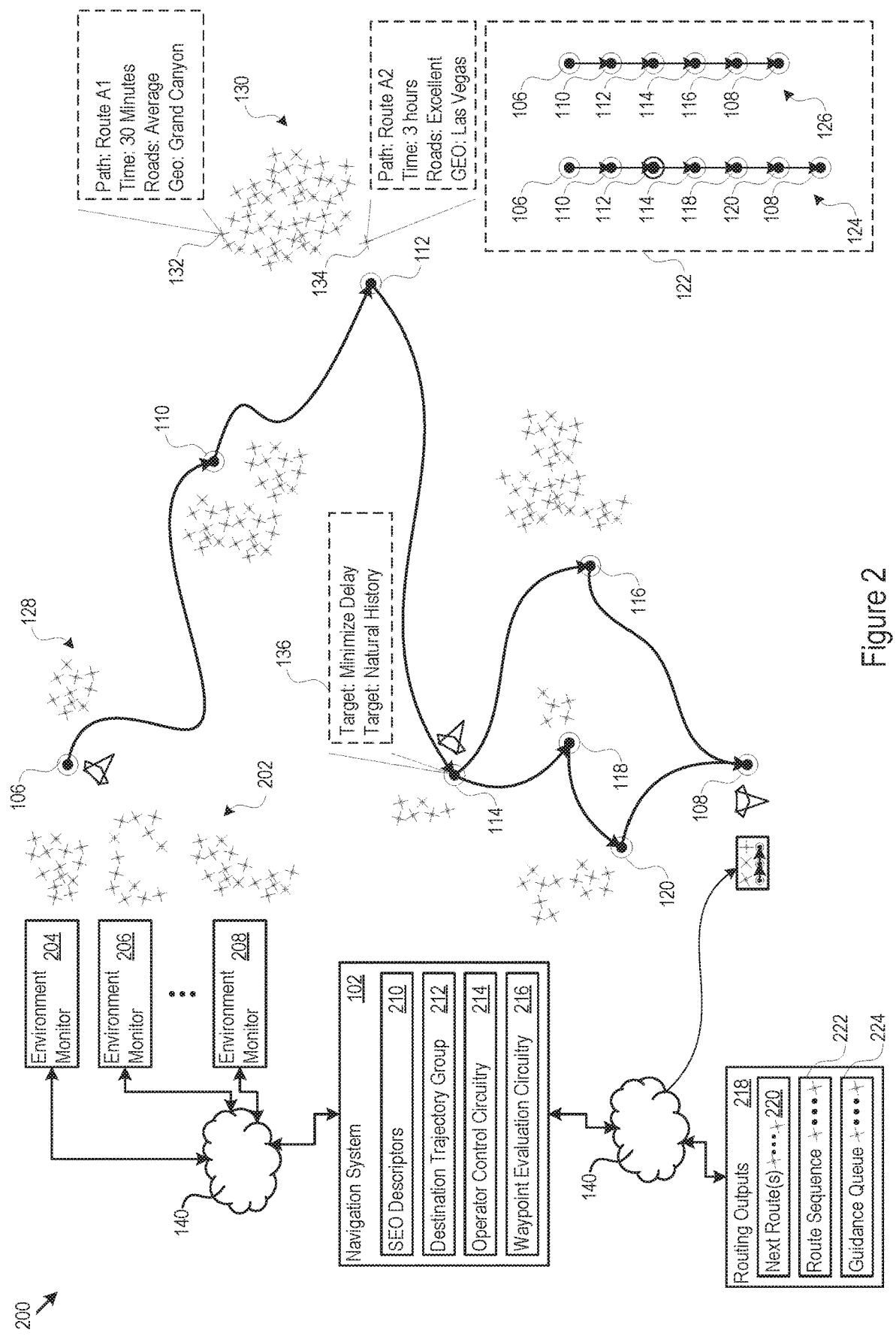
FIG. 2 shows an example navigation architecture.
Figure 4:
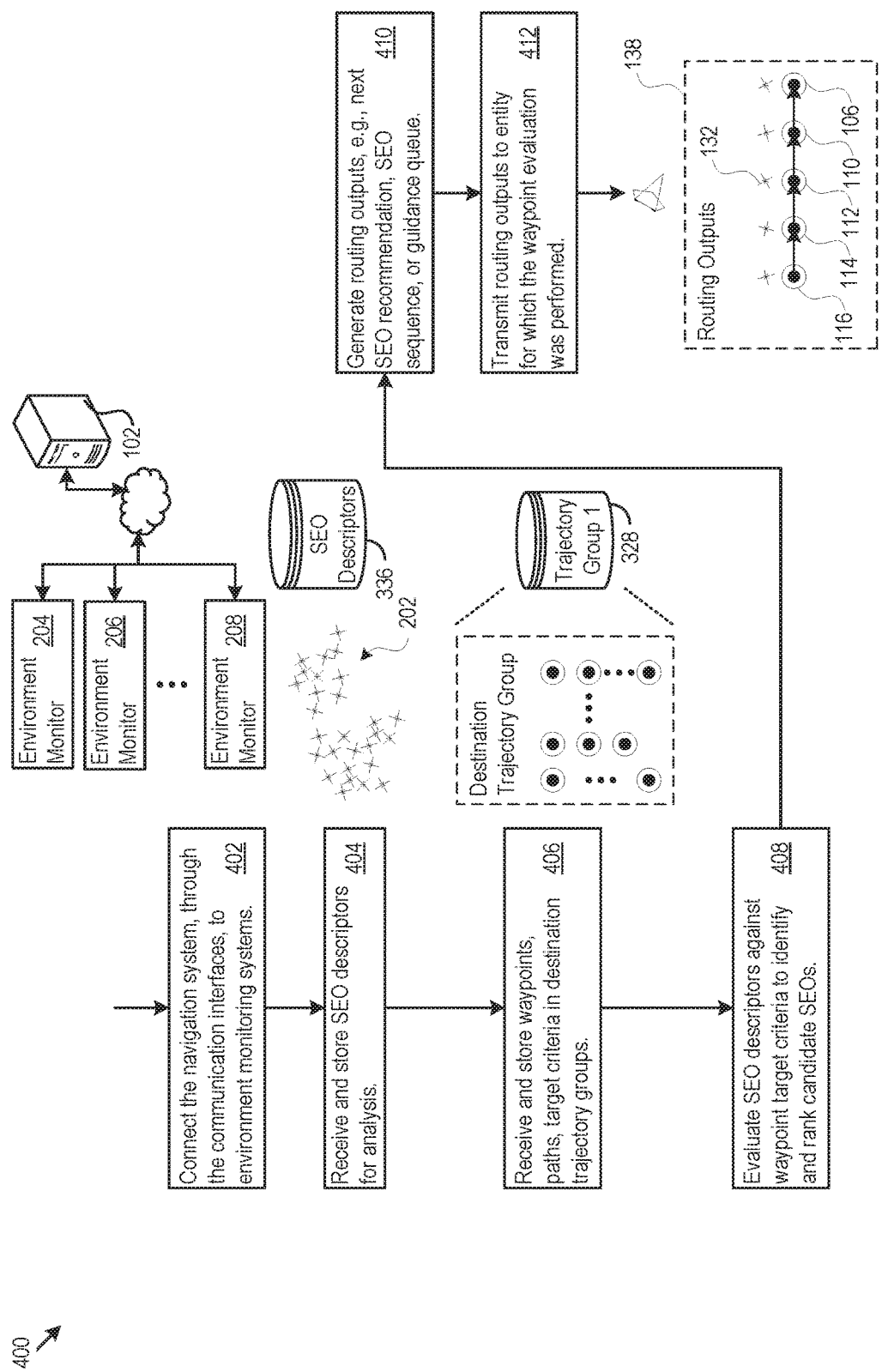
FIG. 4 shows logic for temporal-spatial navigation that a navigation system may implement.

FIG. 2 extends the example in FIG. 1, showing an example navigation architecture 200. In the discussion of FIG. 2 below, reference is also made to FIG. 4, which shows logic 400 for temporal-spatial navigation that a navigation system may implement. In this example, the navigation system 102 connects to communicates with environment monitors, e.g., the environment monitors 204, 206, and 208 that determine the available SEOs 202 (402). As a few examples, the environment monitors may be implemented as public or private pre-configured databases (e.g., road databases, geography databases, and weather databases), news feed receivers, messaging posting forums, web-site monitors, or other systems that detect and determine SEOs. The environment monitors collect and transmit the SEO descriptors 210 to the navigation system 102, which receives and stores them for analysis (404).

The navigation system 102 stores a destination trajectory group 212 (406). The destination trajectory group 212 includes the waypoints, paths, and target criteria expressed as waypoint dimensions for any journey from a current waypoint to a goal waypoint. The navigation system 102 may receive the destination trajectory group through the operator control circuitry 214 form any entity in communication with the navigation system 102. Alternatively, the navigation system 102 may define and store pre-configured destination trajectory groups for specific journeys.

The waypoint evaluation circuitry 216 evaluates the SEO descriptors 210 to make recommendations and decisions about which SEOs 202 best match the target criteria for an upcoming waypoint (408). In connection with its analysis, the waypoint evaluation circuitry 216 generates routing outputs 218 (410). One example of routing outputs 218 is the next route/next SEO recommendation 220 of one or more next SEOs to pursue, e.g., ranked according to how well each SEO meets the target criteria for an upcoming waypoint. Another example of routing outputs 218 is the route/SEO sequence 222 of a series of SEOs the entity should consider pursuing to move between any starting waypoint and any goal waypoint. In some instances, the route sequence 222 may take the form of a guidance queue 224 for the entity. The guidance queue 224 may represent the best match SEOs to take at any given waypoint. The navigation system 102 transmits the routing outputs to the entity (412) for which the waypoint evaluation was performed. A guidance system for the entity may then automatically pursue the queued SEOs as the entity reaches each new waypoint. The guidance queue 224 thereby facilitates efficient automatic movement between intermediate waypoints toward an ultimate goal waypoint.

Figure 3:
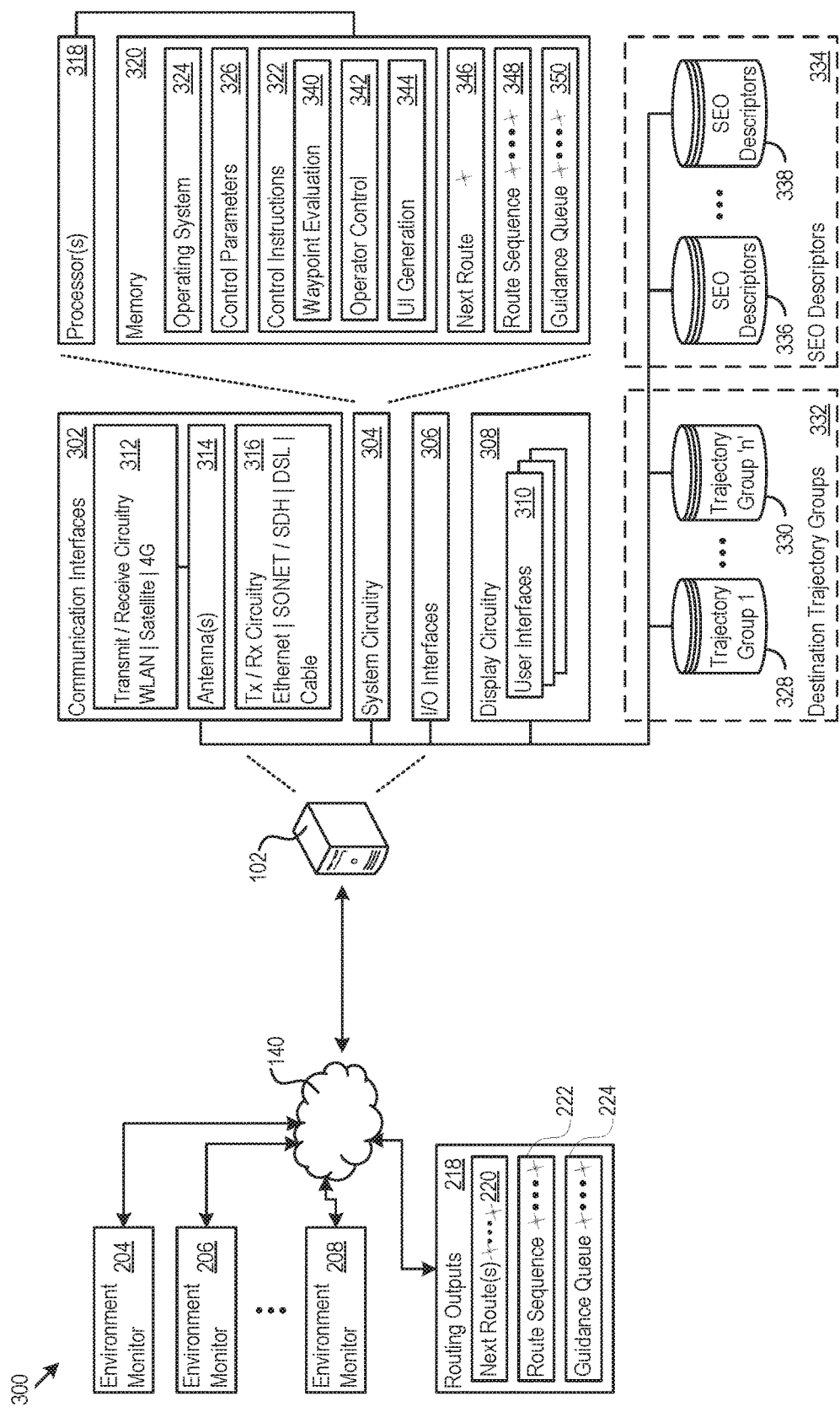
FIG. 3 shows an example implementation of a navigation system.

FIG. 3 shows an example implementation 300 of the navigation system 102. The navigation system 102 includes communication interfaces 302, system circuitry 304, input/output (I/O) interfaces 306, and display circuitry 308. The user interface (UI) generation instructions 344 generate the UIs 310 locally using the display circuitry 308, or for remote display, e.g., as HTML output for a web browser running on a local or remote machine. Among other interface features, the UIs 310 may facilitate entry and specification of waypoint dimensions, path specification, grouping of paths into destination trajectory groups, and other aspects. The UIs 310 and the I/O interfaces 306 may include graphical user interfaces (GUIs), touch sensitive displays, voice or facial recognition inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit and receive circuitry of the transceivers 312. The transceivers 312 and antennas 314 may support WiFi network communications, for instance, under any version of IEEE 802.11, e.g., 802.11n or 802.11ac. The communication interfaces 302 may also include physical medium transceivers 316. The physical medium transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include any combination of hardware, software, firmware, or other circuitry. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of any desired functionality in the navigation system 102, including the operator control circuitry 214 and the waypoint evaluation circuitry 216. As just one example, the system circuitry 304 may include one or more instruction processors 318 and memories 320. The memory 320 stores, for example, control instructions 322 and an operating system 324. In one implementation, the processor 318 executes the control instructions 322 and the operating system 324 to carry out any desired functionality for the navigation system 102. The control parameters 326 provide and specify configuration and operating options for the control instructions 322, operating system 324, and other functionality of the navigation system 102.

The navigation system 102 may include any number of local data repositories, e.g., the data repositories 332 and 334 that include volume storage devices, e.g., arrays of disk drives. The storage devices may store databases that the control instructions 322 access, e.g., through a database control system, to perform the functionality implemented in the control instructions 322 and perform the functionalities described below.

In the example shown in FIG. 3, the databases include destination trajectory group databases 328 and 330 that store, e.g., destination trajectory groups of waypoints and paths for any number of entities. The databases further include SEO descriptor databases 336 and 338 that store, e.g., the SEO descriptors that capture the characteristic data elements for SEOs.

The control instructions 322 drive the functionality of the navigation system 102. In the example of FIG. 3, the control instructions 322 include waypoint evaluation instructions 340, operator control instructions 342, and UI generation instructions 344. The waypoint evaluation instructions 340 compare the SEO descriptors stored in the data repository 334 to the target characteristics defined in the waypoints for the destination trajectory groups stored in the data repository 332. The waypoint evaluation instructions 340 thereby determine and rank SEOs according to their degree of match to the target criteria. The waypoint evaluation instructions 340 may generate match scores based on any selected attributes, which may be weighted according to individual operator settings. In some instances, the waypoint evaluation instructions 340 analyzes textual data elements, metadata, graphical data elements, audio data elements, and other data types in a multivariate regression evaluation to determine the match scores. In other implementations, machine learning algorithms, e.g., random forest algorithms, or cosine overlap of SEO descriptors against waypoint target criteria may generate the match scores. The waypoint evaluation instructions may implement other evaluation techniques, including as just two examples the A* search algorithm or a Greedy algorithm.

The data repositories 332 and 334, control instructions 322, control parameters 326, I/O interfaces 306 and the structure and content of the generated GUIs improve the functioning of the underlying computer hardware itself. That is, these features (among others described below) are specific improvements in way that the underlying computer system operates. The improvements facilitate more efficient, accurate, consistent, and precise search, location, and selection of the best SEOs for navigating a complex path or set of paths. The improved functioning of the underlying computer hardware itself achieves further technical benefits. For example, the navigation system 102 avoids tedious manual processing, reduces the possibility for human error, and therefore increases navigation efficiency with reduced resource expenditure.

Figure 5:
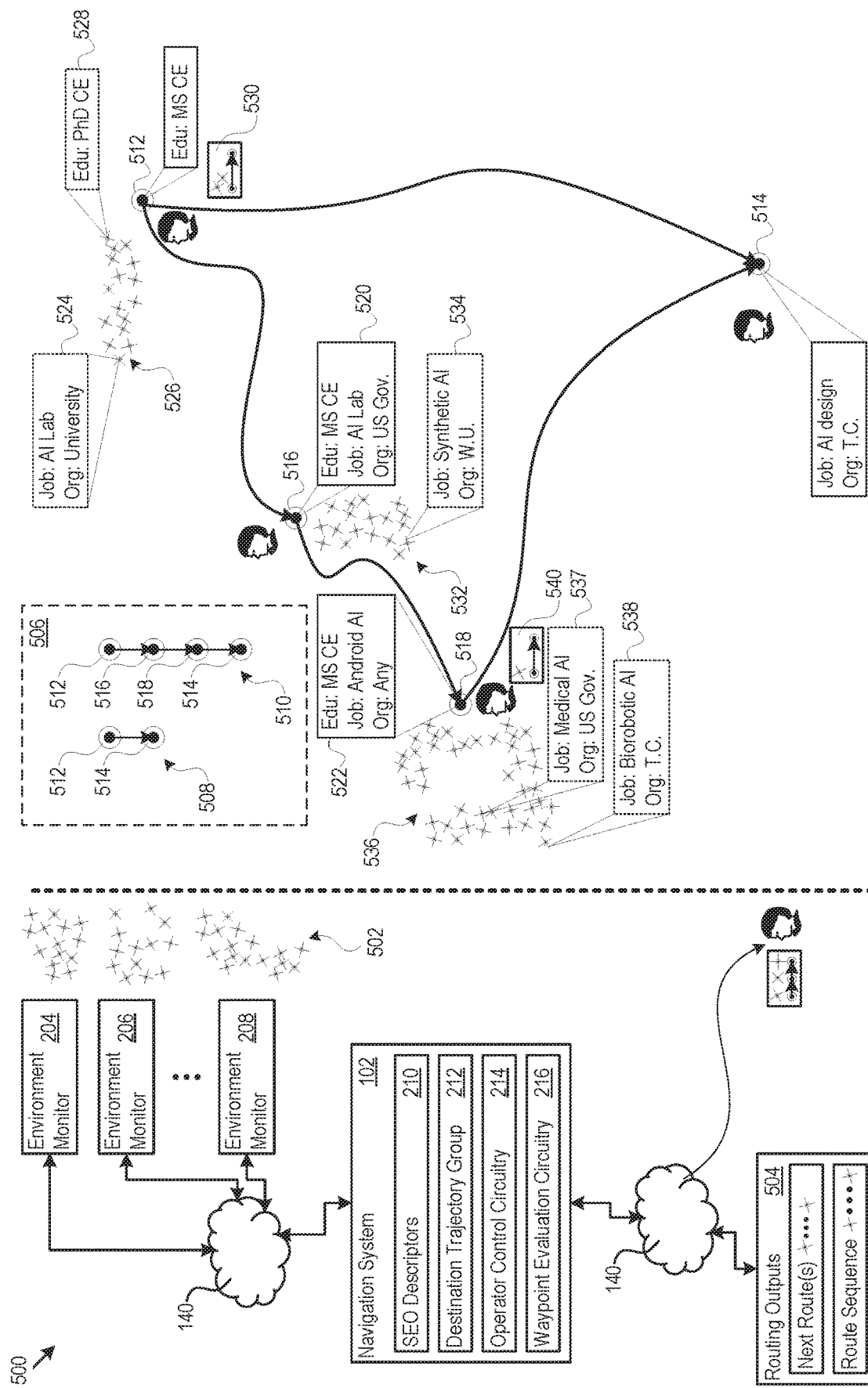
FIGS. 5 and 6 show additional examples of navigation in different contexts with different types of target criteria.
Figure 6:
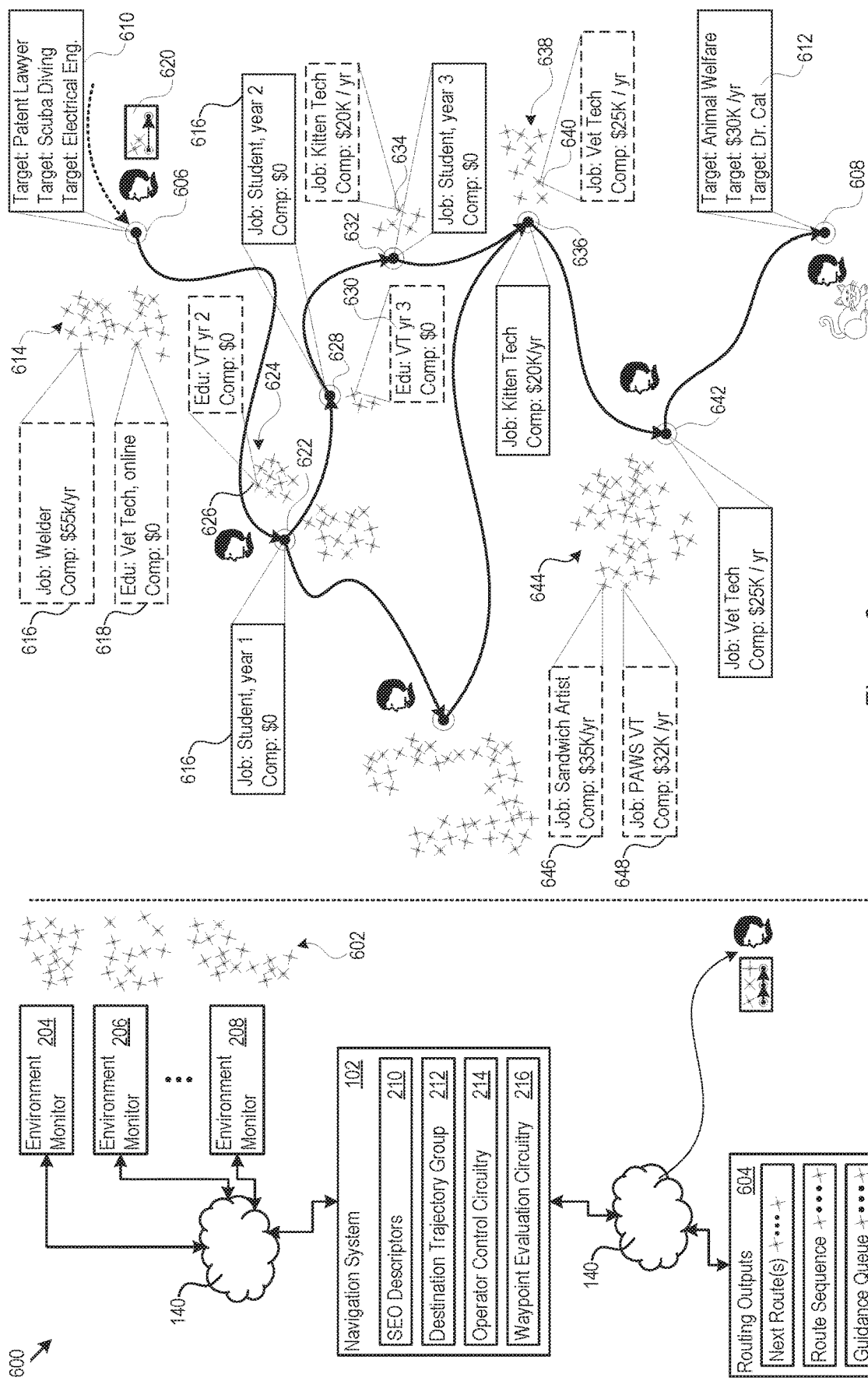

FIGS. 5 and 6 show additional examples of navigation in somewhat different contexts with different types of target criteria. FIGS. 5 and 6 illustrate how the navigation system 102 may adapt to navigation challenges of many different types. More specifically, in some implementations, the navigation system 102 guides an individual to a destination along a path (or paths) that includes one or more directed goals defined as waypoints along those paths. Examples of directed goals include, as examples: financial compensation, e.g., a target amount for salary, bonus, or stock options; co-workers, e.g., specifying a particular individual to work with, or a particular team to work with; and aspirations, e.g., to work on a project or team or in an environment with specified social, medical, political, environmental, or human or animal welfare goals. Other examples of directed goals include: location, e.g., to work or live or travel to a particular geographic location; skills, e.g., to learn or improve a work related skill (e.g., C++ programming) or personal skill (e.g., classical guitar); and fitness (e.g., to be able to run a marathon).

In FIG. 5, the directed goals relate to education and job role. In this example, the navigation system 102 receives the SEO descriptors 502 and generates routing outputs 504 that guide the individual along the destination trajectory set 506. The destination trajectory set 506 includes two paths, the path 508 including waypoints 512, 514, and the path 510 including waypoints 512, 516, 518, 514. In this example, the individual has defined the two paths to capture viable scenarios for moving from the staring waypoint 512 to the target criteria of a job in artificial intelligence design at Tyrell Corp as captured in the target criteria for the goal waypoint 514. The path 510 includes the intermediate waypoint 516 with target criteria 520 of a master's degree in computer engineering and a job gaining experience in an AI lab, e.g., with the US government. The path 510 includes the intermediate waypoint 518 with target criteria 522 of a master's degree in computer engineering and android job experience with any organization. The path 512 has the two waypoints 512 and 514.

There may be any number of SEOs available at any given waypoint. The SEOs may be discovered ahead of time, e.g., relatively static SEOs may be discovered ahead of reaching any given waypoint, or SEOs may be discovered on an ongoing basis, including during the time spent at a given waypoint. The navigation system 102 may obtain the SEOs via direct submission by an operator through the user interfaces 310, by mining news or other data feeds or data sources, by requesting or receiving opportunities from external opportunity tracking systems, including job posting systems such as Upwork or Indeed, educational institutions with offerings online or on-campus, volunteering or social work programs, or in many other ways.

The starting waypoint 512 represents current skill and experience of the individual and includes the target criteria of a master's degree in computer engineering. The navigation system 102 evaluates the SEO descriptors against the upcoming waypoint target criteria, e.g., the criteria captured for any of the waypoints 516, 518 and 514. The navigation system 102 does not find any matches to move directly to the goal waypoint 514, e.g., there are no jobs current posted for Tyrell Corp. in AI design. However, the navigation system identifies that the SEO 524 is a partial match to the intermediate waypoint 516 due to the AI lab experience at a university captured by the SEO 524. There are many other SEOs 526 available at the starting waypoint 512, e.g., the SEO 528 which is the opportunity to earn a Ph.D. in computer engineering at a national university. These other SEOs may be better or worse matches that the SEO 524. The navigation system 102 may order the SEOs according to any pre-defined preferences, e.g., education is more important than compensation, and work experience or learned skills are more important than education. The navigation system 102 transmits the ranked SEOs to the individual, e.g., as next route options 530.

FIG. 5 continues with the assumption that the individual accepts the position in the AI lab at the university. The new waypoint is the intermediate waypoint 516. At this waypoint, a different set of SEOs exist—the SEOs 532. Among the many SEOs 532 is the SEO 534: the opportunity to take a job at W.U. Corp. in the design of synthetic AI. The navigation system evaluates SEO 534 as a match to the next intermediate waypoint 518, and delivers the SEO 534 to the individual as a next route option. The SEO 534 specifies doing work in android AI for any organization. At the intermediate waypoint 518, new SEOs 536 emerge over time. Two examples are the SEO 537, capturing a job developing medical AI applications for a hospital, and the SEO 538, capturing a job developing autonomous biorobotic AI for T. C. The navigation system evaluates the SEOs 536 and identifies the SEO 538 as a matching opportunity, and transmits the SEO 538 details to the individual as a next route option 540.

Note that in other situations, e.g., as specified by individual parameter settings in the navigation system 102, the navigation system 102 may automatically take a preconfigured action responsive to a matching or highest ranked SEO. For instance, the navigation system 102 may automatically apply for the individual to take the SEO, e.g., by applying for a job, submitting a resume, or sending a request communication to the SEO controlling agent. In other implementations, the navigation system 102 may automatically generate guidance over multiple waypoints by building a guidance queue of reserved SEOs.

FIG. 6 provides another navigation example 600 regarding directed goals with regard to aspirations, colleagues, and education. In this example, the navigation system 102 receives the SEO descriptors 602 and ultimately generates routing outputs 604. It was noted above that waypoints are characterized by one or more dimensions corresponding to selected target criteria. The starting waypoint 606 represents a current state of the individual, e.g., in terms of waypoint dimensions of education, experiences, skill, age, or other dimensions. The goal waypoint 608 represents a target state that the individual would like to achieve, e.g., in terms of the same or different waypoint dimensions. For this particular example, the waypoint dimensions 610 for the starting waypoint 606 are: {Job: patent attorney; Experience: 20 long years; Skills: electrical engineering, power tools, Scuba diving} and the waypoint dimensions 612 for the goal waypoint 608 are: {Job: animal welfare; Financial: $30K/yr; Co-workers: Dr. Cat}.

At the staring waypoint 606, multiple SEOs 614 are available. For instance, the SEO 616 is described by a job posting for a Welder making $55K/yr, and the SEO 618 is described by a university course catalog posting for an online Veterinary Technology degree program, without any benefits or stipend. The navigation system 102 evaluates the SEO descriptors against the goal waypoint target criteria, and identifies that the SEO 616 is a partial match due to the animal welfare target in the waypoint dimensions 612, and that the SEO 616 is also a partial match due to the compensation of $55K/yr. Other SEOs may be better or worse matches. The navigation system 102 may order or rank the matching SEOs according to any pre-defined preferences, e.g., education is more important than compensation. The navigation system 102 transmits the ranked SEOs to the individual, e.g., as next route options 620.

FIG. 6 continues with the assumption that the individual immediately quits their job and takes the educational opportunity. The new waypoint is the intermediate waypoint 622, characterized by new dimensions {Job: student, year 1; Comp: $0}. At this waypoint, a different set of SEOs exist—the SEOs 624. Among the many SEOs 624 is the SEO 626: the opportunity to continue in the veterinary technology program into year 2. The example assumes that the individual continues in the veterinary technology program, thereby reaching intermediate waypoint 628. The SEO 630 available at intermediate waypoint 628 identifies the option to continue to the last year, year 3, of the veterinary technology program. The individual pursue this SEO and reaches the intermediate waypoint 632.

The program is complete, and one available SEO 634 describes a job that includes bottle feeding motherless kittens, with compensation of $20K/yr. As with the other waypoints, the navigation system 102 evaluates the descriptors of the SEO 634 against the waypoint target criteria, and finds that kitten feeding matches the animal welfare target, and that $20K/yr compensation represents progress toward the $30K/yr target. As such, the navigation system 102 may transmit the SEO 634 to the individual as a highly ranked next route option. During the job feeding kittens, represented by waypoint 636, new SEOs 638 become available, including the SEO 640: a job as a veterinary technician at $25K/yr. The navigation system 102 determines that the SEO 640 represents progress toward the $30K/yr target criteria and, again, may transmit the SEO to the individual for consideration. At intermediate waypoint 642, the individual has the job as the veterinary technician at $25K/yr, when new SEOs 644 become available. Among the SEOs 644 is the SEO 646 which describes a job as a sandwich artist at $35K/yr, and the SEO 648, which describes a job as veterinary technician for Dr. Cat at Pets Are Worth Saving (PAWS) in Chicago, at $32K/yr. Both of the SEOs 646 and 648 are matches to the waypoint dimensions 612 for the goal waypoint 608, but the SEO 646 is only a partial match on compensation, while the SEO 648 matches all of the target criteria. As such, the navigation system 102 may identify the SEO 646 and the SEO 648 as possible next route options, with the SEO 648 designated as the highest ranking/completely matching option.

Figure 7:
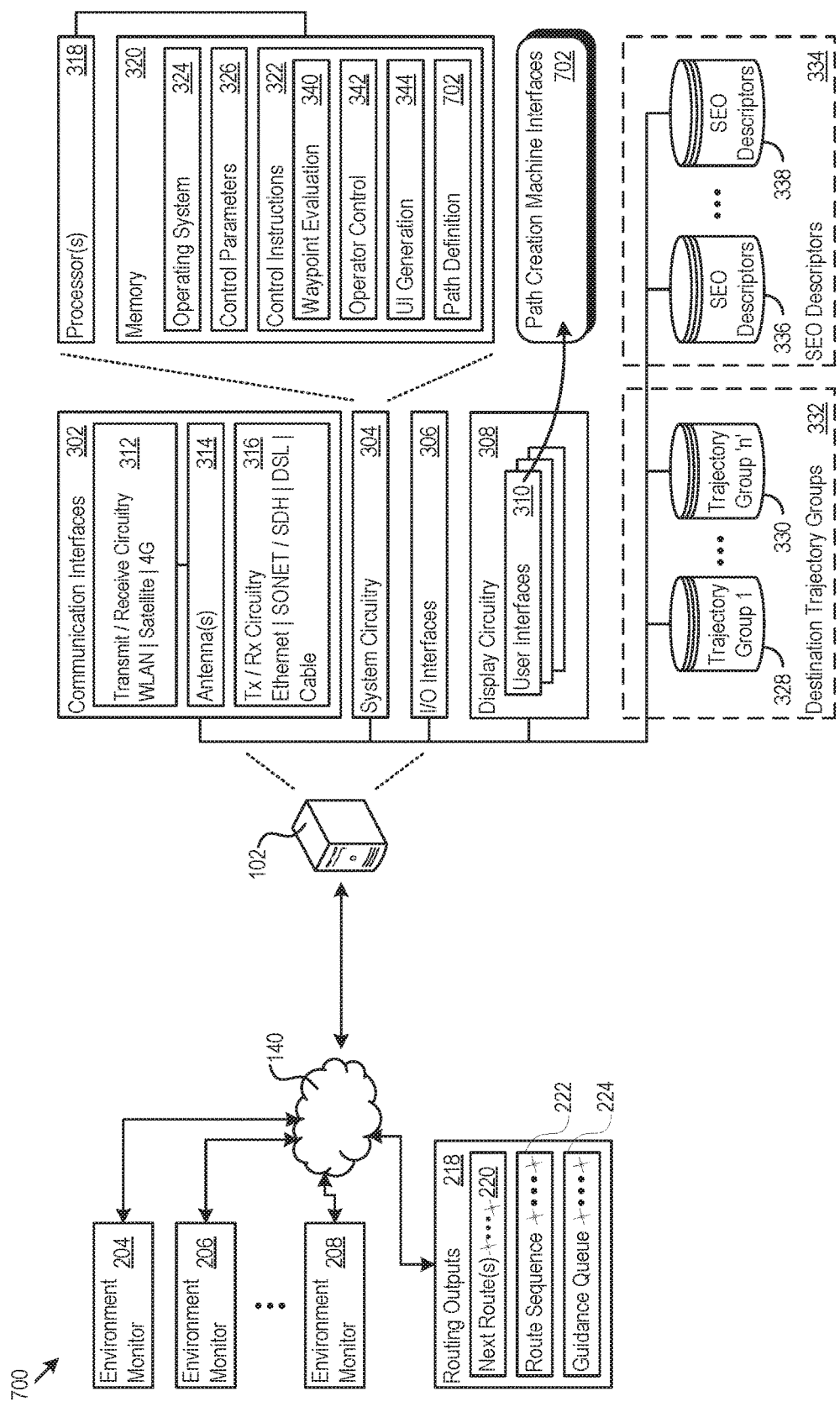
FIGS. 7 and 8 show a navigation architecture and an example trajectory definition machine interface.

FIG. 7 shows another view of a navigation architecture 700. In particular, FIG. 7 notes that the user interfaces 310 may include path creation machine interfaces 702. That is, the UI generation instructions 344 and the operator control instructions 342 may render machine interfaces through which an operator defines their waypoints, paths, and destination trajectory sets, including specification of waypoint target criteria for any waypoint.

Figure 8:
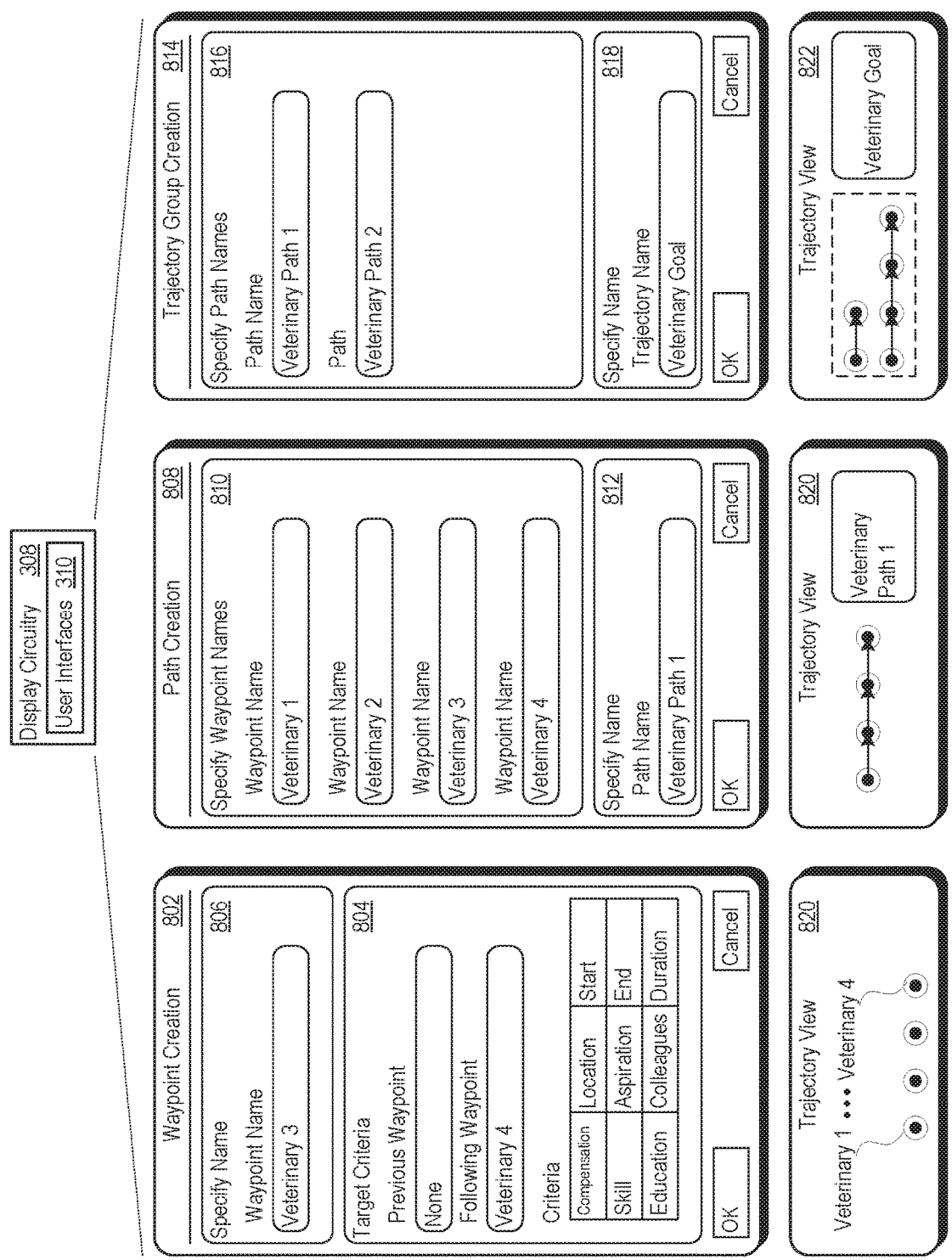

FIG. 8 shows one example 800 of the trajectory creation machine interfaces 702. In FIG. 8, the waypoint creation interface 802 accepts via the criteria panel 804 a specifier of a previous waypoint, a following waypoint, and target criteria, e.g., one or more specifiers of compensation, skill, education, location, aspirations, desired colleagues or teams, start date, end date, overall duration, or other criteria. The waypoint creation interface 802 also accepts a waypoint name via the waypoint name panel 806.

A path creation interface 808 accepts a set one or more waypoint names via the waypoint name panel 810. The navigation system 102 responds by joining the named waypoints into a path. The path creation interface 808 may accept a path name via the path name panel 812.

A trajectory group creation interface 814 accepts a set one or more path names via the path name panel 816. The navigation system 102 responds by joining the named paths into a destination trajectory set. The trajectory group creation interface 814 may accept a trajectory set name via the trajectory name panel 818. The navigation system 102 updates the trajectory view 820 to reflect the waypoints, paths, and destination trajectory sets, as the operator defines these elements.

Figure 9:
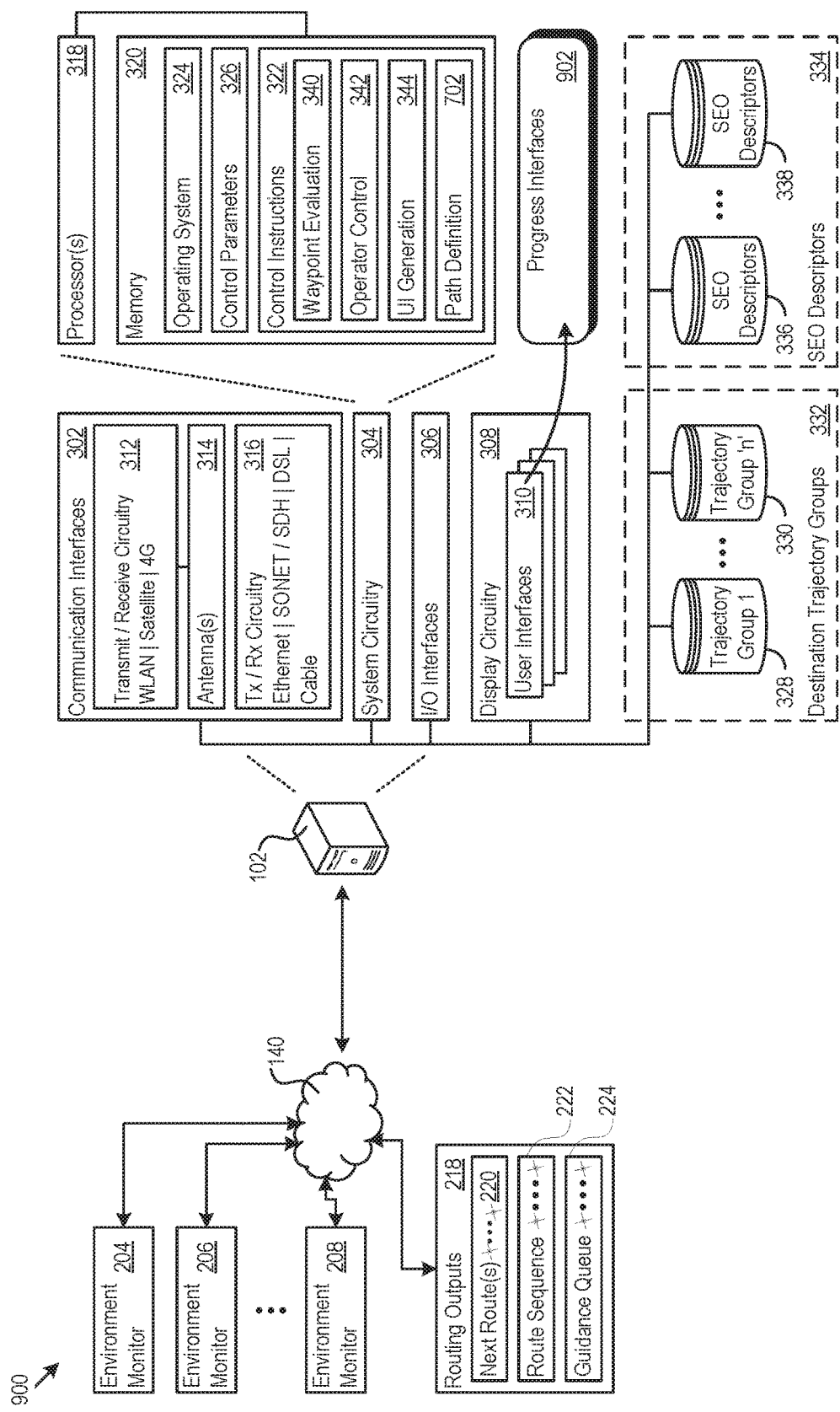
FIGS. 9 and 10 show a navigation architecture and an example trajectory progress machine interface.

FIG. 9 shows another view of a navigation architecture 900. In particular, FIG. 7 illustrates that the user interfaces 310 may include trajectory progress machine interfaces 902. That is, the UI generation instructions 344 and the operator control instructions 342 may render machine interfaces through which an individual may track navigation progress along on or more paths. The trajectory progress machine interfaces 902 may also accept operator input of waypoint priorities. The waypoint priorities are an example of control parameters 326, and may direct the navigation system 102 to preferentially search for SEOs along a path that includes the prioritized waypoints, for instance.

Figure 10:
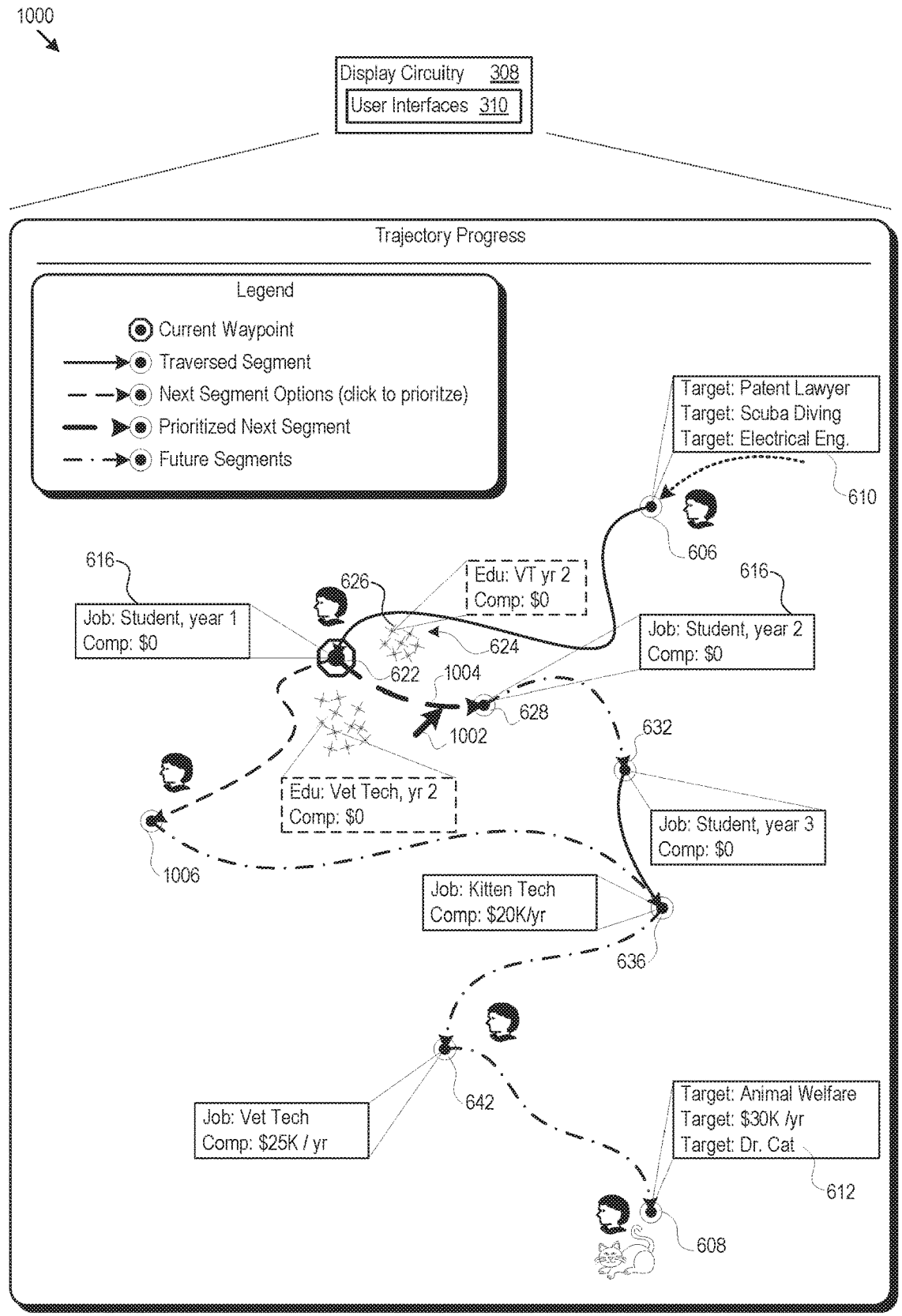

FIG. 10 shows one example 1000 of a trajectory progress machine interface. The interface highlights the current waypoint, previously traverse path segments, and shows waypoint options for continuing ahead toward other waypoints. FIG. 10 also shows an example in which the operator has used the designation cursor 1002 to select the waypoint 628 as a prioritized waypoint. As a result, the navigation system 102 marks the segment 1004 as a prioritized segment. The operation of the navigation system 102 may change to transmit matching SEOs to the individual for consideration for moving toward the prioritized waypoint 628, instead of, e.g., the alternate next waypoint 1006.

Expressed another way, in some execution environments, the extensive technical capabilities of the navigation system 102 allow an individual to build a personal path defined on that individual's values and goals, whether those goals are personal, social, or professional. The path creation machine interfaces 702 facilitate the creation of a well-defined curve of waypoints that represent each step or stage along one or more personal paths. The navigation system 102 monitors individual progress, and based on any upcoming waypoint target criteria, executes SEO searches to evaluate and rank SEO matches for next steps to take along the personal path. Accordingly, the individual need not waste their limited resources to search, evaluate, and rank enormous pools of possible SEOs. The navigation system 102 understands the individual goals and through the waypoint target criteria establishes explicit connections between the individual and the types of opportunities sought. As noted above, the target criteria can range widely, and as a few examples may include compensation or other financial goals, working with specific individual or teams, purpose or aspirational goals, personal or profession skill development, and goals for what experiences to have, when, and where.

The methods, devices, processing, circuitry, and logic of the navigation system described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The navigation system 102 may implement the logic 400 for temporal-spatial navigation in any combination of the control instructions 322, UI generation instructions 344, control parameters 326, operator control circuitry 214, or waypoint evaluation circuitry 216. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. For instance, some implementations may implement opportunity prediction. Two examples are noted below.

One type of opportunity prediction that the navigation system 102 may implement is prediction of upcoming SEOs. For instance, the navigation system 102 may capture known event cycles in the data repositories, and the waypoint evaluation circuitry 216 may consider and evaluate the SEOs known to exist or predicted to exist with the known event cycles. One specific example is the prediction of SEOs due to holidays and seasonal or otherwise known events, e.g., additional sales job openings at Christmas, additional security needed at the superbowl, or extra educational roles to fill concerning an upcoming solar eclipse. In response to the known event cycles, the waypoint evaluation circuitry 216 takes into consideration these future predicted SEOs and may assume that they are available according to the known event cycles. The waypoint evaluation circuitry 216 may then formulate paths that assume or anticipate that the additional SEOs are available at a future date, as opposed to proposing only paths that do not include the predicted SEOs.

A second type of opportunity prediction that the navigation system 102 may implement is prediction of upcoming SEOs from trend data. As one example, the system 102 collects, e.g., jobs numbers and predicted trends form a third party source, or may itself predict the trends. With this additional data, the waypoint evaluation circuitry 216 formulates a path that predicts or assumes that additional SEOs will exist for a particular job at a specified time, responsive to the predicted trend. In the example of FIG. 6, for instance, the system 102 may gather trend data from the United States Department of Labor that indicates a predicted 19% growth in SEOs over the next 10 years for veterinary technicians. These additional SEOs may allow, for instance, the waypoint evaluation circuitry 216 to establish the trajectory path that specifically includes the trajectory waypoint 642 through the veterinary technology position.

What is claimed is:

1. A system for presenting dynamic paths within a multi-dimensional parameter space, the system comprising:
 a communication interface;
 a data storage layer in communication with the communication interface, the data storage layer configured to store:
  a geographic path defined by a sequence of waypoints comprising target criteria;
  spatial-temporal event/opportunity descriptors (SEO descriptors) received via the communication interface from pre-configured databases including road databases, geography databases, and weather databases, wherein the SEO descriptors are data items that each include geographic navigation options in at least two different dimensions; and
 waypoint evaluation circuitry configured to:
  generate a trajectory creation machine interface comprising:
   a waypoint creation interface configured to accept the target criteria and waypoint names for the sequence of waypoints composing the geographic path;

a path creation interface configured to accept designations of the sequence of waypoints to define the geographic path; and a trajectory group creation interface configured to accept designations of path names that identify a destination trajectory group, including the geographic path;

generate a trajectory progress machine interface comprising: a designation cursor operable to specify a prioritized waypoint along the geographic path;

designate a path segment leading to the prioritized waypoint as a prioritized segment;

determine a current waypoint on the geographic path;

determine that the prioritized waypoint is on the geographic path with the current waypoint;

determine target criteria linked to the prioritized waypoint via the waypoint creation interface;

evaluate the SEO descriptors to determine a matching SEO at least partially meeting the target criteria linked to the prioritized waypoint according to the at least two different dimensions included in the corresponding matching SEO;

add the matching SEO to a guidance queue;

update a guidance message based on the contents of the guidance queue including the matching SEO;

automatically choose to pursue the matching SEO in the guidance queue as the current waypoint changes and the prioritized waypoint then follows the current waypoint on the geographic path; and communicate acceptance of the matching SEO through the communication interface to an external entity responsible for the matching SEO.

2. A system for presenting dynamic paths within a multi-dimensional parameter space, the system comprising:

a communication interface;

a data storage layer in communication with the communication interface, the data storage layer configured to store:

a geographic path defined by a sequence of waypoints comprising target criteria;

spatial-temporal event/opportunity descriptors (SEO descriptors) received via the communication interface from pre-configured databases including road databases, geography databases, and weather databases, wherein the SEO descriptors are data items that each include geographic navigation options in at least two different dimensions; and waypoint evaluation circuitry configured to:

determine a current waypoint on the geographic path;

determine a subsequent waypoint on the geographic path with respect to the current waypoint;

determine target criteria linked to the subsequent waypoint;

evaluate the SEO descriptors to determine a matching SEO for moving toward the subsequent waypoint on the geographic path according to the at least two different dimensions included in the corresponding matching SEO;

add the matching SEO to a guidance queue with previously matched SEOs;

update a guidance message based on the contents of the guidance queue including the matching SEO;

determine when the current waypoint on the geographic path changes; and automatically execute on the SEOs in the guidance queue depending on the current waypoint on the geographic path.

3. The system of claim 2, where the waypoint evaluation circuitry is further configured to:

determine when the current waypoint changes;

automatically accept a best-matching SEO among the SEOs in the guidance queue; and communicate acceptance of the best-matching SEO through the communication interface to an external entity responsible for the best-matching SEOs.

4. The system of claim 2, where:

the waypoint evaluation circuitry is further configured to:

transmit descriptors for the matching SEO for consideration by an external entity.

5. The system of claim 2, where:

the waypoint evaluation circuitry is further configure to:

generate a trajectory creation machine interface; and accept path definition inputs through the communication interface responsive to the trajectory creation machine interface.

6. The system of claim 5, where:

the trajectory creation machine interface comprises a waypoint creation interface configured to accept, for the subsequent waypoint: the target criteria and a waypoint name.

7. The system of claim 5, where:

the trajectory creation machine interface comprises a path creation interface configured to accept designations of waypoints that define the geographic path, including the current waypoint and the subsequent waypoint.

8. The system of claim 5, where:

the trajectory creation machine interface comprises a trajectory group creation interface configured to accept designations of path names that identify a group of geographic paths; and evaluating the group of geographic paths as a destination trajectory group toward a specific goal.

9. The system of claim 2, where:

the waypoint evaluation circuitry is further configured to:

generate a trajectory progress machine interface;

accept a designation input of a prioritized waypoint along the geographic path, through the trajectory progress machine interface;

designate a path segment leading to the prioritized waypoint as a prioritized segment; and limit transmission of matching SEOs to those SEOs matching target criteria for the prioritized waypoint.

10. A method for presenting dynamic paths within a multi-dimensional parameter space, the method comprising:

providing a communication interface;

providing a data storage layer in communication with the communication interface, the data storage layer, and storing:

a geographic path defined by a sequence of waypoints comprising target criteria;

spatial-temporal event/opportunity descriptors (SEO descriptors) received via the communication interface from pre-configured databases including road databases, geography databases, and weather databases, wherein the SEO descriptors are data items that each include geographic navigation options in at least two different dimensions; and with waypoint evaluation circuitry:

determining a current waypoint on the geographic path;

determining a subsequent waypoint on the geographic path with respect to the current waypoint;

determining target criteria linked to the subsequent waypoint; and evaluating the SEO descriptors to determine a matching SEO for moving toward the subsequent waypoint on the geographic path according to the at least two different dimensions included in the corresponding matching SEO adding the matching SEO to a guidance queue with previously matched SEOs; and updating a guidance message based on the contents of the guidance queue including the matching SEO;

determining when the current waypoint on the geographic path changes; and automatically executing on the SEOs in the guidance queue depending on the current waypoint on the geographic path.

11. The method of claim 10, further comprising:

determining when the current waypoint changes;

automatically accepting a best-matching SEO among the SEOs in the guidance queue; and communicating acceptance of the best-matching SEO through the communication interface to an external entity responsible for the SEO.

12. The method of claim 10, further comprising:
transmitting descriptors for the matching SEO for consideration by an external entity.

13. The method of claim 10, further comprising:
generating a trajectory creation machine interface; and
accepting path definition inputs through the communication interface responsive to the trajectory creation machine interface.

14. The method of claim 13, where generating comprises:
generating a waypoint creation interface configured to accept, for the subsequent waypoint: the target criteria and a waypoint name.

15. The method of claim 13, where generating comprises:
generating a path creation interface configured to accept designations of waypoints that define the geographic path, including the current waypoint and the subsequent waypoint.

16. The method of claim 13, where generating comprises:
generating a trajectory group creation interface configured to accept designations of path names that identify a group of geographic paths; and
evaluating the group of geographic paths together as a destination trajectory group.

* * * * *